US011408551B2

(12) United States Patent
Chapuis et al.

(10) Patent No.: US 11,408,551 B2
(45) Date of Patent: Aug. 9, 2022

(54) METHODS FOR PROVIDING QUICKLY CUSTOMIZABLE APPARATUSES THAT SECURE PORTABLE ELECTRONIC DEVICES TO DISPLAY TABLES AND OTHER DISPLAY SURFACES

(71) Applicant: OnQ Solutions, Inc., Hayward, CA (US)

(72) Inventors: Paul F. Chapuis, Woodside, CA (US); Steven D. Penny, Oakland, CA (US); William B. Tenney, Pleasanton, CA (US)

(73) Assignee: OnQ Solutions, Inc., Hayward, CA (US)

( * ) Notice: Subject to any disclaimer, the term of this patent is extended or adjusted under 35 U.S.C. 154(b) by 0 days.

(21) Appl. No.: 17/163,790

(22) Filed: Feb. 1, 2021

(65) Prior Publication Data

US 2021/0164603 A1    Jun. 3, 2021

Related U.S. Application Data

(62) Division of application No. 16/572,283, filed on Sep. 16, 2019, now Pat. No. 10,920,922.
(Continued)

(51) Int. Cl.
*F16M 11/04* (2006.01)

(52) U.S. Cl.
CPC ......... *F16M 11/04* (2013.01); *F16M 2200/02* (2013.01); *F16M 2200/08* (2013.01)

(58) Field of Classification Search
CPC ............... F16M 11/04; F16M 2200/02; F16M 2200/08; F16M 11/02; F16M 11/041;
(Continued)

(56) References Cited

U.S. PATENT DOCUMENTS

| 6,700,488 B1 | 3/2004 | Leyden et al. |
| 7,187,283 B2 | 3/2007 | Leyden et al. |

(Continued)

OTHER PUBLICATIONS

Gripzo, "iPad Enclosure", https://www.gripzo.com/en/products/tablets/ipad-enclosure, downloaded on Jun. 11, 2018.
(Continued)

*Primary Examiner* — Christopher Garft
(74) *Attorney, Agent, or Firm* — Vierra Magen Marcus LLP

(57) ABSTRACT

Security apparatuses, and methods for providing the same, are described herein. In certain embodiments, a security apparatus includes first and second mounting brackets each including a respective support shelf and a respective support arm. One or more brace elements are attached to the support shelf of each of the mounting brackets. Each brace element includes a respective corner element to be placed over a respective one of four corners of a rectangular shaped portable electronic device. A pair of neck portions are securable to one another with the first and second support arms sandwiched therebetween. A collar is configured to be slid over and encase peripheries of the neck portions. One or more bolts or other fastener(s) extending from at least one of the neck portions, or attached thereto, is/are used to secure the security apparatus to a tabletop of a display table or to another display surface.

20 Claims, 11 Drawing Sheets

Related U.S. Application Data

(60) Provisional application No. 62/875,706, filed on Jul. 18, 2019.

(58) Field of Classification Search
CPC ...... F16M 11/043; F16M 11/06; F16M 11/16; E05B 73/00; E05B 73/0082; A47F 7/024; A47F 7/0042; A47F 7/00; A47F 5/16; A47F 7/0246; F16B 2/12
See application file for complete search history.

(56) References Cited

U.S. PATENT DOCUMENTS

| | | | |
|---|---|---|---|
| 8,191,851 B2 | 6/2012 | Crown | |
| 8,360,373 B2 | 1/2013 | Johnson et al. | |
| 8,701,452 B2 | 4/2014 | Foster et al. | |
| 8,814,128 B2* | 8/2014 | Trinh | F16M 13/00 340/568.2 |
| 8,864,089 B2 | 10/2014 | Hung | |
| 8,925,886 B2 | 1/2015 | Sears | |
| 8,985,544 B1 | 3/2015 | Gulick, Jr. | |
| 8,998,048 B1 | 4/2015 | Wu | |
| 9,022,337 B2 | 5/2015 | Petruskavich | |
| 9,039,785 B2 | 5/2015 | Gulick, Jr. | |
| 9,097,380 B2 | 8/2015 | Wheeler | |
| 9,159,309 B2 | 10/2015 | Liu et al. | |
| 9,161,466 B2 | 10/2015 | Huang | |
| 9,499,373 B1* | 11/2016 | Kim | B65H 75/4402 |
| 9,568,141 B1 | 2/2017 | Zaloom | |
| 9,714,528 B2 | 7/2017 | Van Balen | |
| 9,936,823 B2 | 4/2018 | Galant | |
| 10,165,873 B2 | 1/2019 | Gulick, Jr. et al. | |
| 2008/0142665 A1 | 6/2008 | Belden et al. | |
| 2008/0202958 A1* | 8/2008 | Hanlen | B65D 85/30 206/320 |
| 2010/0108828 A1 | 5/2010 | Yu et al. | |
| 2010/0148030 A1 | 6/2010 | Lin | |
| 2011/0068919 A1* | 3/2011 | Rapp | A47F 7/024 340/568.2 |
| 2011/0068920 A1* | 3/2011 | Yeager | F16M 13/02 340/568.8 |
| 2012/0037783 A1* | 2/2012 | Alexander | A47F 7/024 248/551 |
| 2012/0234055 A1 | 9/2012 | Bland, III et al. | |
| 2013/0301216 A1* | 11/2013 | Trinh | A47F 7/0246 361/679.58 |
| 2013/0318639 A1 | 11/2013 | Gulick, Jr. | |
| 2014/0060218 A1 | 3/2014 | Bisesti et al. | |
| 2014/0092531 A1* | 4/2014 | Trinh | F16M 11/041 361/679.01 |
| 2014/0226298 A1 | 8/2014 | Palmer et al. | |
| 2015/0089675 A1 | 3/2015 | Gulick, Jr. | |
| 2015/0108948 A1 | 4/2015 | Gulick, Jr. et al. | |
| 2015/0196140 A1 | 7/2015 | Lin | |
| 2015/0300050 A1 | 10/2015 | Van Balen | |
| 2016/0278544 A1* | 9/2016 | Rubino | F16M 11/041 |
| 2017/0188724 A1 | 7/2017 | Lin | |
| 2018/0058107 A1 | 3/2018 | Lucas et al. | |
| 2018/0279809 A1* | 10/2018 | Regan | A47F 5/13 |
| 2018/0324974 A1 | 11/2018 | Mills | |
| 2021/0018137 A1 | 1/2021 | Chapuis et al. | |

OTHER PUBLICATIONS

Gripzo, "iPhone", https://www.gripzo.com/en/products/smartphones/iphone, downloaded on Jun. 11, 2018.

Scorpion Security Products, "4-Point ERS Phone Scorpion", https://www.scorpionsecurityproducts.com/product/4-point ers-phone-scorpion/, downloaded on Jun. 11, 2018.

Scorpion Security Products, "4-Point ERS Small Tablet Scorpion", https://www.scorpionsecurityproducts.com/product/4-point-ers-small-tablet-scorpion/, downloaded on Jun. 11, 2018.

Dongguan Comer Electronic Technology Co., Ltd., "Comer Anti-Theft Locking Laptop Mechanical Security Display Frame For Mobile Phone Stores", http://www.comerdisplay.com/sale-8024631-comer-anti-theft-locking-laptop-mechanical-security-display-frame-for-mobile-phone-stores.html, downloaded on Jun. 11, 2018.

Dongguan Comer Electronic Technology Co., Ltd., "Comer Universal Display Mechanical Anti-Theft Security Display Locking System For Tablet Brackets", http://www.smartcomer.com/sale-8028445-comer-universal-display-mechanical-anti-theft-security-display-locking-system-for-tablet-brackets.html, downloaded on Jun. 11, 2018.

RTF, "Vise—Securely And Attractively Placing Your Product First", http://www.rtfglobal.com/products/vise-cell-phone-security/, downloaded on Jun. 11, 2018.

RTF, "Smartphones—Samsung Note 3, LG Flex, HTC One, Apple iPhone 5, Blackberry Z10", http://www.rtfglobal.com/solutions/by-devices-type/smartphones/#!prettyPhoto, downloaded on Jun. 11, 2018.

Gripzo, "Universal Smartphone Grip/ Universal Tablet Grip", https://www.gripzo.com/en/products/smartphones/iphone, downloaded on Jun. 14, 2018.

Restriction Requirement dated Oct. 26, 2020, U.S. Appl. No. 16/572,283, filed Sep. 16, 2019.

Response to Restriction Requirement dated Oct. 26, 2020, U.S. Appl. No. 16/572,283, filed Sep. 16, 2019.

Non-Final Office Action dated Nov. 13, 2020, U.S. Appl. No. 16/572,283, filed Sep. 16, 2019.

Response to Office Action dated Nov. 25, 2020, U.S. Appl. No. 16/572,283, filed Sep. 16, 2019.

Notice of Allowance dated Dec. 15, 2020, U.S. Appl. No. 16/572,283, filed Sep. 16, 2019.

* cited by examiner

METHODS FOR PROVIDING QUICKLY CUSTOMIZABLE APPARATUSES THAT SECURE PORTABLE ELECTRONIC DEVICES TO DISPLAY TABLES AND OTHER DISPLAY SURFACES

PRIORITY CLAIM

This application is a Divisional of U.S. patent application Ser. No. 16/572,283, filed Sep. 16, 2019, which issued as U.S. Pat. No. 10,920,922 on Feb. 16, 2021, which claims priority to U.S. Provisional Patent Application No. 62/875,706, filed Jul. 18, 2019. Priority is claimed to each of the above applications, and each of the above applications is incorporated herein by reference.

FIELD OF TECHNOLOGY

Embodiments of the present technology relate to apparatuses that secure portable electronic devices to tabletops of display tables and to other display surfaces.

BACKGROUND

Portable electronic devices, such as mobile phones, tablet computers, e-book readers, and the like, are often sold in retail stores. To enable customers to view, touch, and interface with such portable electronic devices in a retail store, the portable electronic devices are often displayed on a display table. The portable electronic devices, which are often costly, are typically secured to the display table to prevent theft. For example, a portable electronic device can be physically secured to a table using what is often referred to as a security display stand. Such security display stands may be customized for a specific size of a specific portable electronic device. It often takes a few weeks to a few months lead-time for a security display stand manufacturer to design, build, and distribute a new customized security display stand that is suitable for securing a portable electronic device to a tabletop of a display table to another display surface. It is typically the case that whenever a new model of a portable electronic device is released, the size of the device is changed compared to the previous model. Accordingly, it is typically the case that whenever a new model of a portable electronic device (e.g., a mobile phone) is released, a new customized security display stand (that is suitable for securing the portable electronic device to a display table) is not available to retail stores for at least a few weeks, and potentially up to a few months.

SUMMARY

Certain embodiments of the present technology are directed to security apparatuses adapted to selectively secure a rectangular shaped portable electronic device (e.g., mobile phone, e-reader, personal data assistant, or a tablet computer) to tabletop of a display table or to another display surface, and methods for providing such security apparatuses. In accordance with an embodiment, such a security apparatus includes first and second mounting brackets, the first mounting bracket including a first support shelf and a first support arm that is at a first angle relative to the first support shelf, and a second mounting bracket including a second support shelf and a second support arm that is at a second angle relative to the second support shelf. The first and second mounting brackets are configured such that the first and second support shelves collectively provide a contiguous support surface when the first and second support arms are placed back-to-back against one another. At least one corner element is secured to the first support shelf, and at least one corner element is secured to the second support shelf. Each of the corner elements is configured to be placed over a respective one of four corners of a rectangular shaped portable electronic device, such as a mobile phone. The security apparatus also includes first and second neck portions configured to be secured to one another with the first and second support arms sandwiched between the first and second neck portions. The first and second neck portions are configured to support the contiguous support surface a distance from a display table or other display surface. Additionally, the security apparatus includes a collar that is configured to be slid over and encase peripheries of the first and second neck portions while the first and second neck portions are secured to one another with the first and second support arms sandwiched between the first and second neck portions.

In accordance with certain embodiments, the first mounting bracket is made from a first blank cut or stamped from a sheet of metal or alloy and bent at the first angle along a first bend line so that the first support arm and the first support shelf are on opposites sides of the first bend line and are at the first angle relative to one another. Similarly, the second mounting bracket is made from a second blank cut or stamped from a sheet of metal or alloy and bent at the second angle along a second bend line so that the second support arm and the second support shelf are on opposites sides of the second bend line and are at the second angle relative to one another. In accordance with certain embodiments, a sum of the first and second angles is 180 degrees.

Each of the first support arm, the second support arm, and the second neck portion can include at least one through-hole extending therethrough, and the apparatus can further include at least one fastener that extends through the through-hole(s) of the first support arm, the second support arm, and the second neck portion to thereby secure the first and second neck portions to one another with the first and second support arms sandwiched between the first and second neck portions.

In accordance with certain embodiments, the at least one corner element secured to the first support shelf comprises first and second corner elements secured to the first support shelf and configured to be placed over first and second corners of a rectangular shaped portable electronic device. Further, the at least one corner element secured to the second support shelf comprises third and fourth corner elements secured to the second support shelf and configured to be placed over third and fourth corners of a rectangular shaped portable electronic device.

In accordance with certain embodiments, the first support shelf of the first mounting bracket includes at least one brace support element extending outward from at least one distal corner region of the first support shelf. Similarly, the second support shelf of the second mounting bracket includes at least one brace support element extending outward from at least one distal corner region of the second support shelf. Further, each of the corner elements is part of a respective brace element that also includes an attachment element that is configured to be attached to one of the brace support elements of one of the first and second support shelves to thereby secure the corner elements to the support shelves. The brace elements that include the corner elements can be secured to the brace support elements of first and second support shelves using a fastener, a notch and a slot, a weld, a braze and/or an adhesive, but is not limited thereto.

In accordance with certain embodiments, the first and second mounting brackets are customized for a specific portable electronic device model. By contrast, the corner elements and the first and second neck portions are configured to be used with a plurality of different portable electronic device models.

In accordance with certain embodiments, a method of providing a security apparatus (that can be used to secure a rectangular shaped portable electronic devices to a tabletop of a display table or to another display surface) includes: stocking in inventory multiple units of each of two or more versions of a brace element that includes a corner element configured to be placed over a corner of a rectangular shaped portable electronic device, each of the versions for use with a different range of portable electronic device thicknesses; stocking in inventory multiple units of first and second neck portions configured to be secured to one another; stocking in inventory multiple units of a collar configured to be slid over peripheries of the first and second neck portions; and stocking in inventory multiple units of fastener hardware. The method further includes producing on-demand custom first and second mounting brackets for a specific model of a specific rectangular shaped portable electronic device. The method further includes selecting one of the versions of the brace elements, based on a thickness of the specific model of the specific rectangular shaped portable electronic device, and attaching one or more of the selected version of the brace element to each of the first and second mounting brackets. The method also involves including, within a box or bag, the custom first and second mounting brackets with the one or more of the selected version of the brace element attached to each of the first and second mounting brackets, along with a unit of each of the first and second neck portions obtained from inventory, a unit of the collar obtained from inventory, and a unit of the fastener hardware obtained from the inventory, wherein the fastener hardware is for use in securing portions of the customized first and second mounting brackets between the units of the first and second neck portions. The fastener hardware can also be for use in attaching the security apparatus to a tabletop of a display table or to another display surface. The method can further involve shipping the box or bag, e.g., to a retail store.

In accordance with certain embodiments, the customized first and second mounting brackets are produced for a specific model of a specific rectangular shaped portable electronic device, by cutting or stamping a first blank from a sheet of metal or alloy, and cutting or stamping a second blank from a sheet of metal or alloy. The method can also involve bending the first blank to form a first support shelf and a first support arm that is at a first angle relative to the first support shelf, the first support shelf and the first support arm comprising parts of the first mounting bracket; and bending the second blank to form a second support shelf and a second support arm that is at a second angle relative to the second support shelf, the second support shelf and the second support arm comprising parts of the second mounting bracket.

In certain embodiments, prior to bending the first and second blanks, holes are drilled in portions of the first and second blanks that will comprise brace support element portions of the first and second support shelves, and further holes are drilled in portions of the first and second blanks that will comprise the support arms. Rivets or other fasteners are inserted through the holes in the portions of the first and second blanks that comprise brace support element portions of the first and second support shelves, and through corresponding holes in attachment elements of the brace elements, to thereby attach the brace elements to the brace support element portions.

In accordance with certain embodiments, computer aided design software is used to design patterns for the first and second blanks based on dimensions for a specific model of a specific rectangular shaped portable electronic device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 4A through 4D can be referred to collectively as FIG. 4.

DETAILED DESCRIPTION

The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

Embodiments of the present technology relate to quickly customizable security apparatuses that can be used to selectively secure a rectangular shaped portable electronic devices to a tabletop of a display table or to another display surface. Examples of such rectangular shaped portable electronic devices, each of which can also be referred to more succinctly as a portable electronic device, include, but are not limited to, mobile phones, tablet computers, e-book readers, and personal data assistants (PDAs).

The quickly customizable security apparatus, which can also be referred to herein more succinctly as a security apparatus or a security display stand, can be used to secure a portable electronic device to a display table in a manner that enables a customer or other person to view, touch, and interface with the portable electronic device. In accordance with the embodiments described herein, certain components of the quickly customizable security apparatus can be used regardless of the size of the portable electronic device with which the security apparatus is intended to be used, while other components of the quickly customizable security apparatus are designed such that they can be manufactured and assembled with a very short lead-time (e.g., in just a few days, and likely in just a few hours). In other words, certain components can be produced on-demand. Accordingly, such embodiments enable a customized security display stand to be available to retailers almost immediately after the dimensions of a new portable electronic device (e.g., a new iPhone™) are released by a company (e.g., by Apple, Inc.™).

Figure 1:
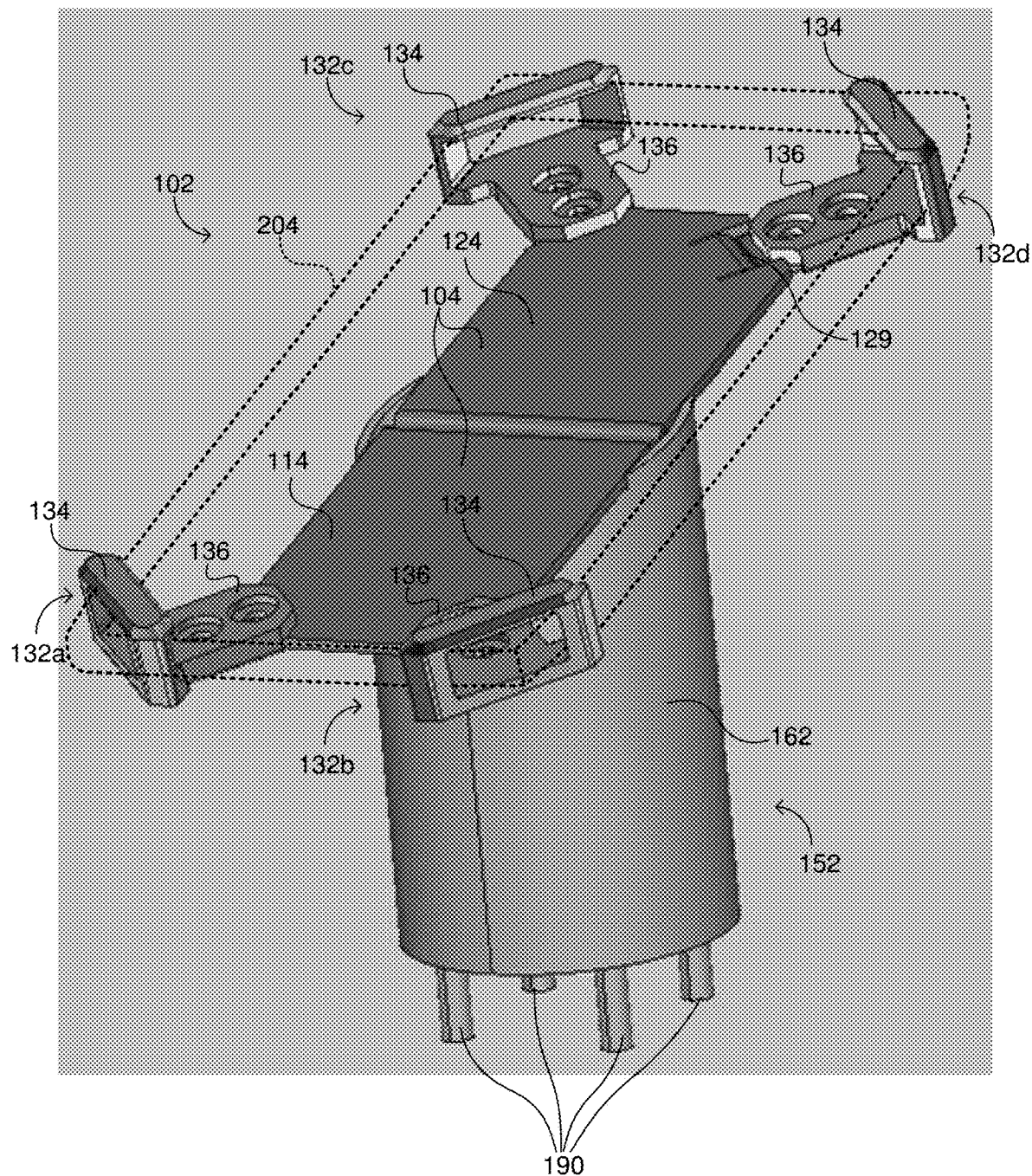
FIG. 1 is a front perspective view of a security apparatus according to an embodiment of the present technology.
Figure 2A:
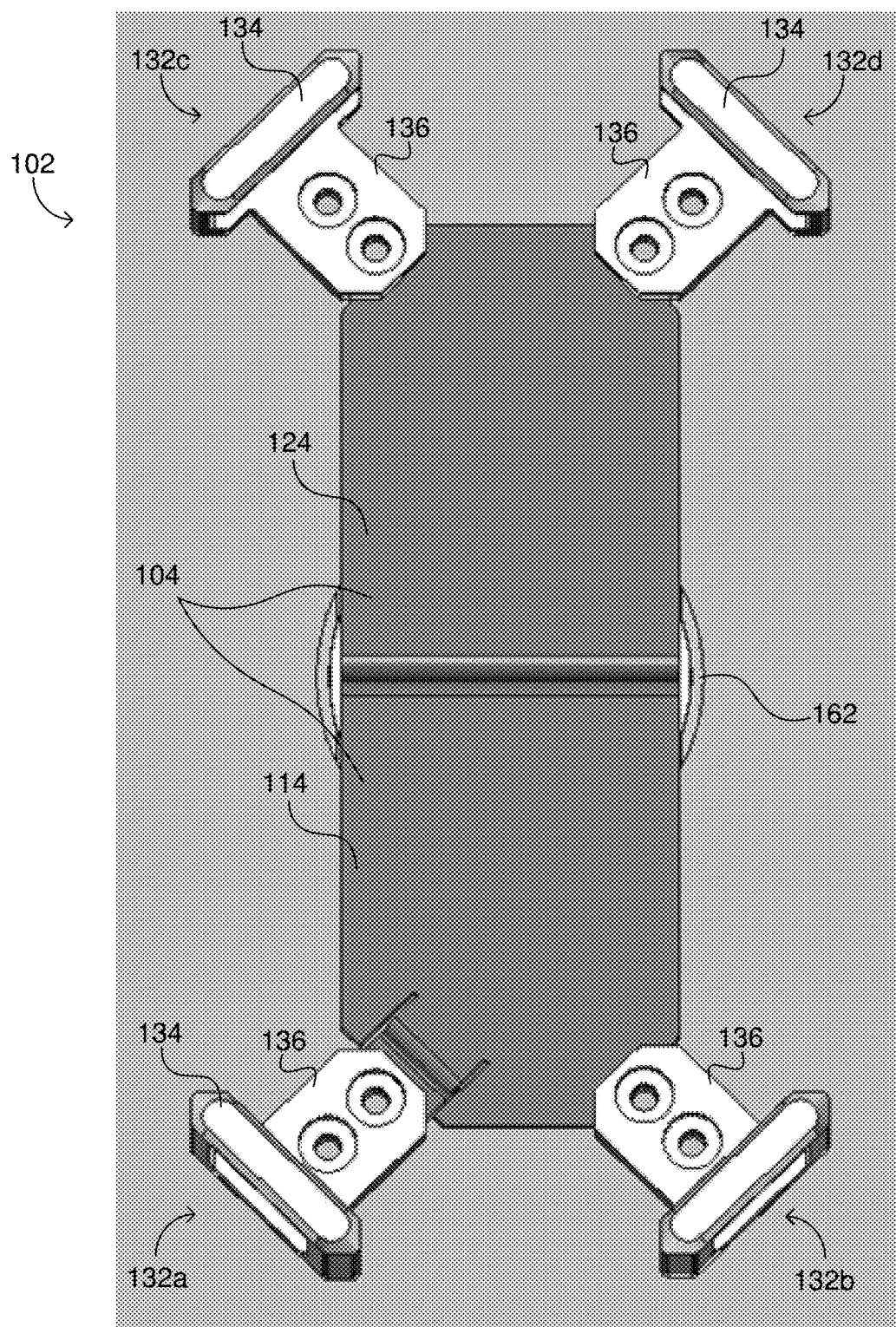
FIG. 2A is top view of the security apparatus introduced in FIG. 1.
Figure 2B:
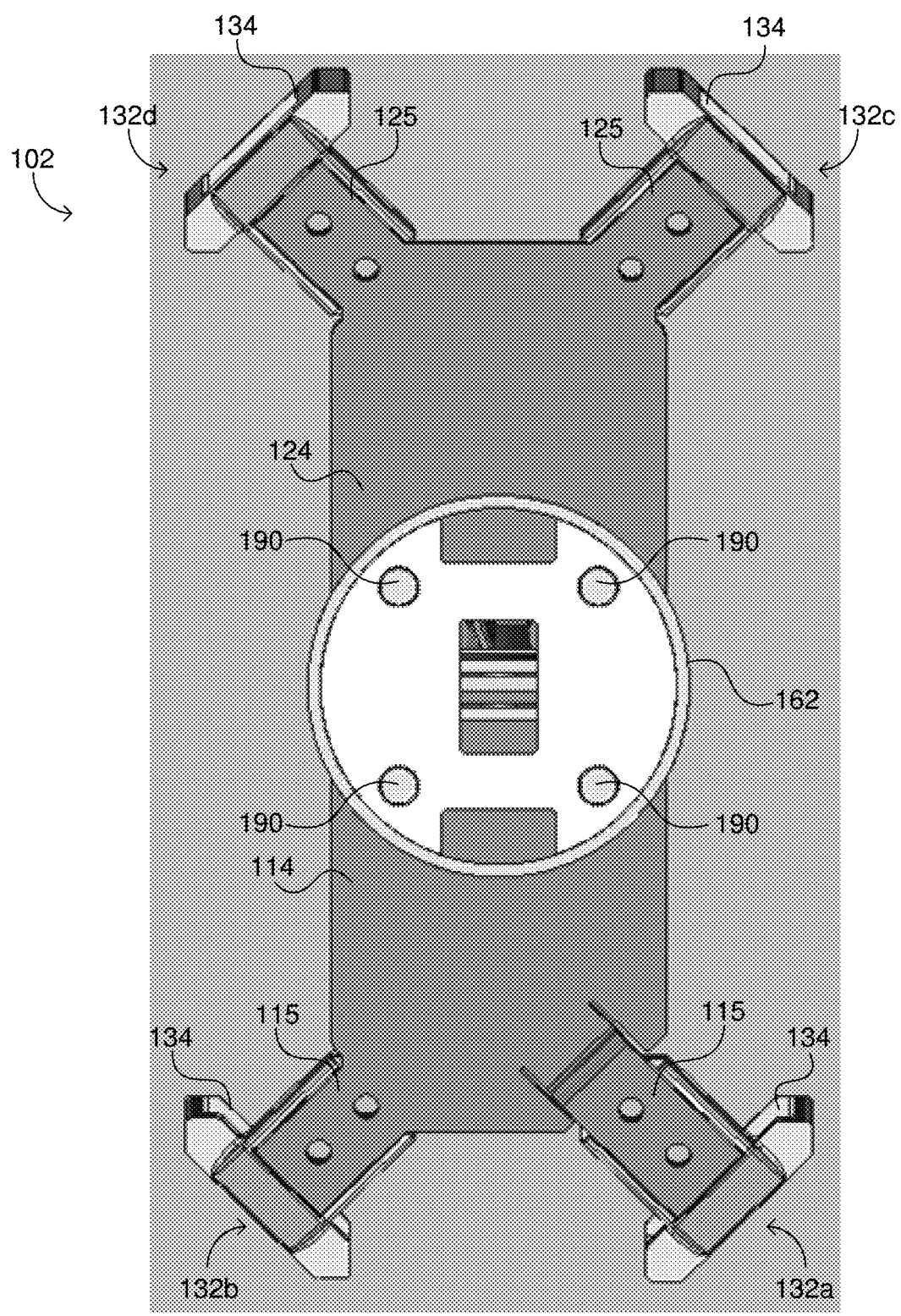
FIG. 2B is a bottom view of the security apparatus introduced in FIG. 1.
Figure 3:
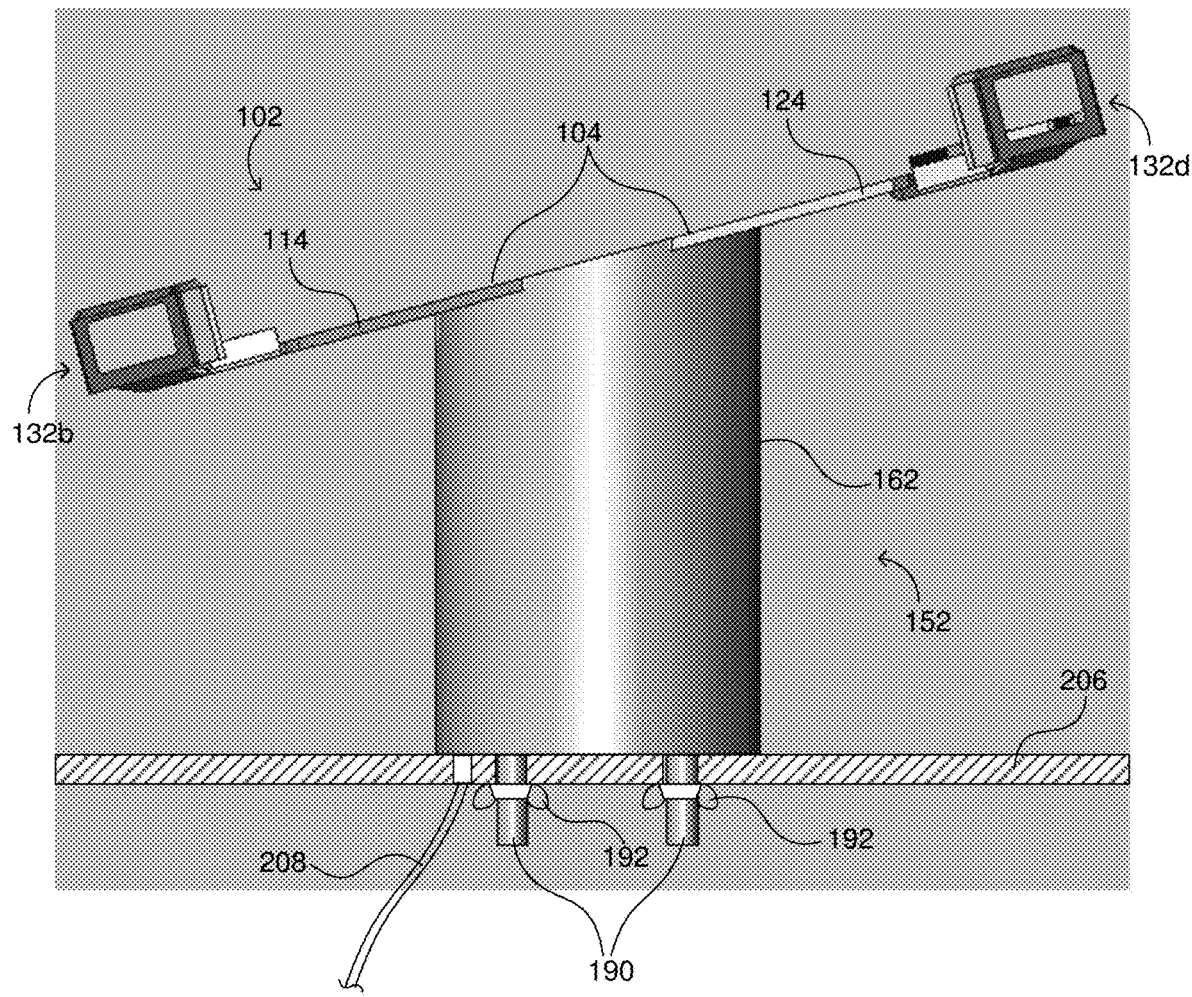
FIG. 3 is side view of the security apparatus introduced in FIG. 1.
Figure 4A:
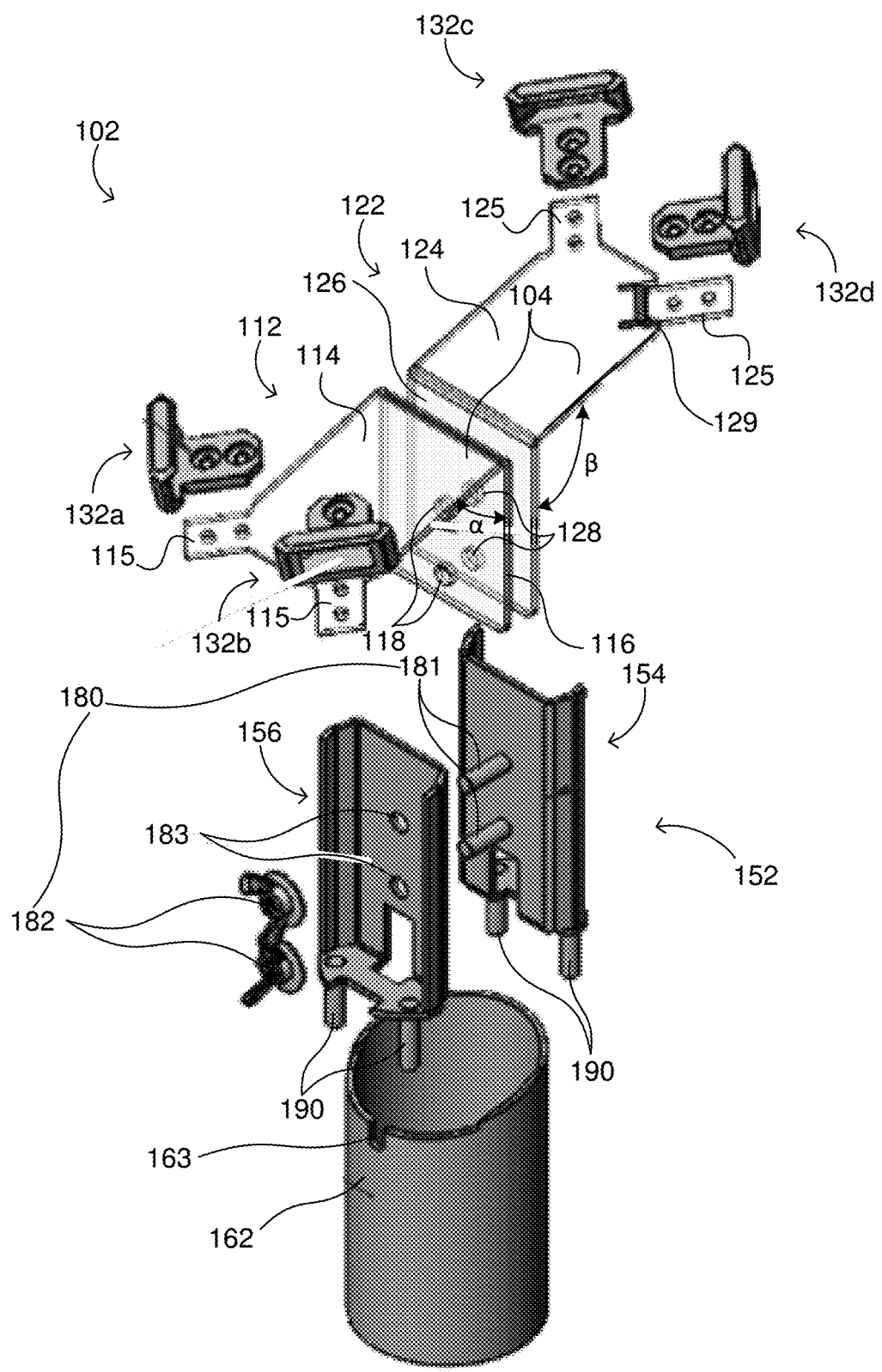
FIG. 4A is an exploded front perspective view of the security apparatus introduced in FIG. 1.
Figure 4B:
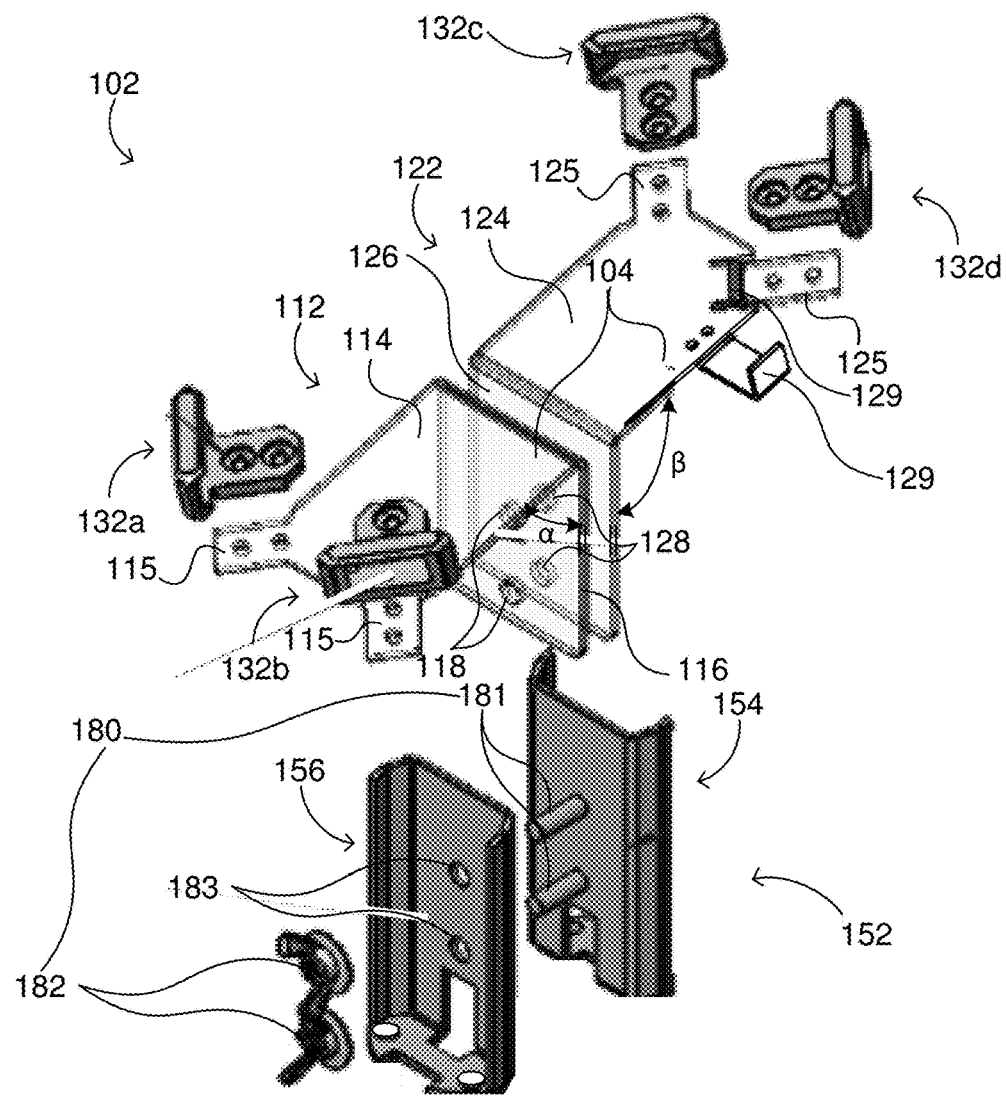
FIG. 4B is an exploded front perspective view of a security apparatus according to another embodiment of the present technology, wherein a neck base is attached to first and second neck portions of the security apparatus.

FIG. 1 is a front perspective view of a quickly customizable security apparatus 102 according to an embodiment of the present technology. The quickly customizable security apparatus 102 can alternatively be referred to as a quickly customizable security display stand 102, or more succinctly as a security display stand or a security apparatus. Referring to FIG. 1, the security apparatus 102 is shown as including a support surface 104 that is at an angle relative to a neck 152. As will be described in additional detail below, e.g., with reference to FIGS. 4 and 5, the support surface 104 is made up of parts of two mounting brackets (112, 122). Still referring to FIG. 1, attached to the support surface 104 are four brace elements 132a, 132b, 132c, and 132d. The four brace elements 132a, 132b, 132c, and 132d, which can be referred to collectively as the brace elements 132, or individually as a brace element 132, are used to secure a portable electronic device (e.g., a mobile phone 204 represented in dotted line) to the support surface 104, and the neck 152 is used to hold the support surface 104 (and any portable electronic device secured thereto) at a distance above (and preferably at an acute angle, e.g., 15 degrees, relative to) a display table. Each of the brace elements 132 includes a corner element 134 and an attachment element 136, which are discussed in more detail below. FIGS. 2A, 2B, and 3 are respectively, front, bottom, and side views of the security apparatus 102 introduced in FIG. 1. FIG. 4A is an exploded front perspective view of the security apparatus 102 introduced in FIG. 1. FIG. 5A is a perspective view of first and second mounting brackets 112, 122, which are also shown in the exploded view in FIG. 4A.

Referring to FIGS. 4A and 5A, the security apparatus 102 is shown as including first and second mounting brackets 112, 122. The first mounting bracket 112 includes a first support shelf 114 and a first support arm 116 that is at an angle α relative to the first support shelf 114. The second mounting bracket 122 includes a second support shelf 124 and a second support arm 126 that is at an angle β relative to the second support shelf 124. In order to cause the first and second support shelves 114, 124 to be contiguous with one another, and at the same angle relative to display table to which the security apparatus 102 is attached, a sum of the angles α and β should equal 180 degrees (i.e., α+β=180 degrees). For example, the angle α can be 75 degrees, and that angle β can be 105 degrees. This would cause the portable electronic device, secured by the security apparatus 102, to be at a 15 degree angle relative to a tabletop of a display table to which the apparatus 102 is secured. For another example, the angle α can be 60 degrees, and that angle β can be 120 degrees. This would cause the portable electronic device, secured by the security apparatus 102, to be at a 20 degree angle relative to a tabletop of a display table to which the apparatus 102 is secured. It would also be possible for the angle α0 to be 90 degrees, and for the angle β to also be 90 degrees. Other values for α and β are also possible and within the scope of the embodiments described herein.

Figure 5A:
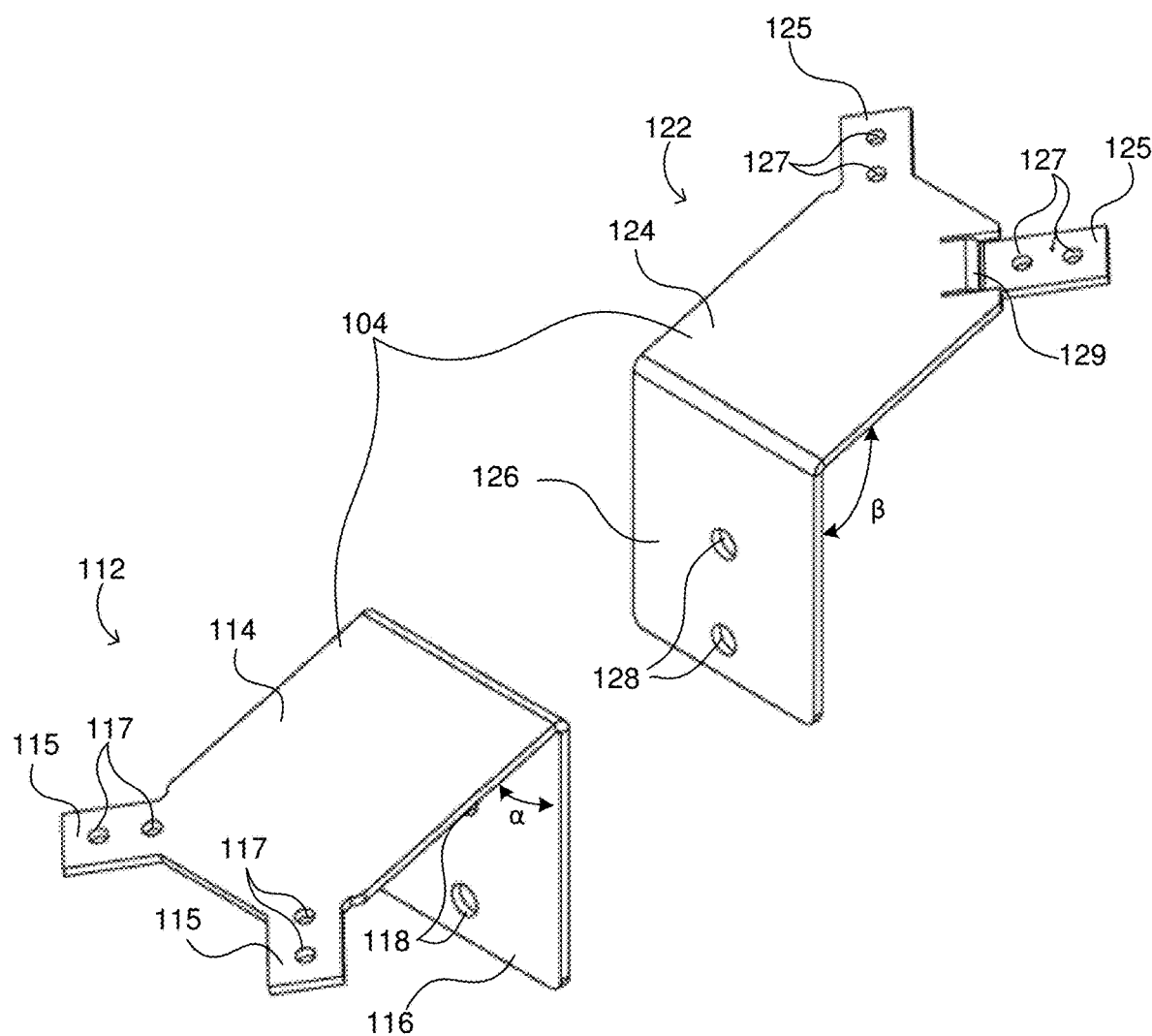
FIG. 5A is a perspective view of the first and second mounting brackets introduced in FIG. 4, and is used to describe additional details of the mounting brackets and components thereof.
Figure 5B:
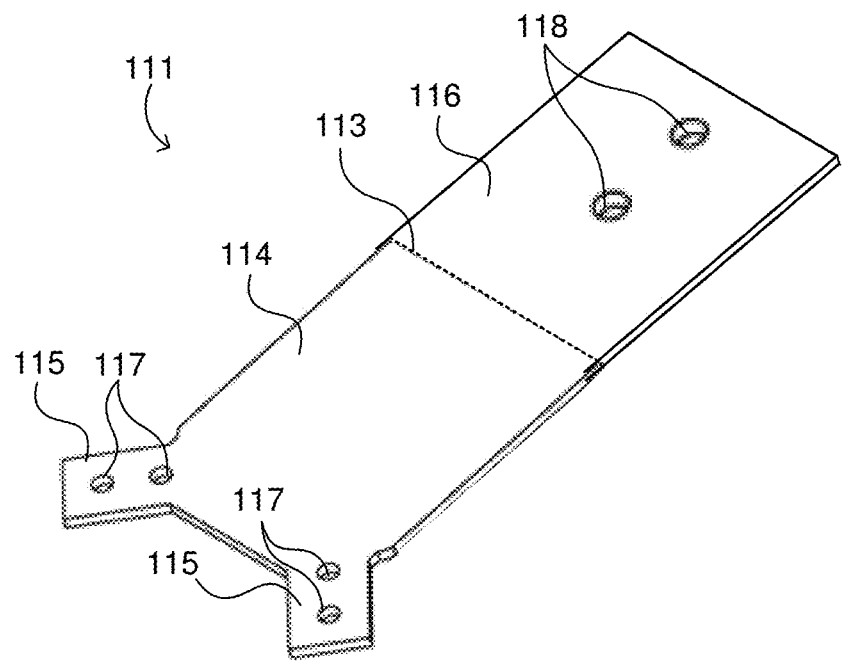
FIG. 5B is a perspective view of a blank that is cut or stamped from a sheet of metal or alloy and thereafter bent to provide the first mounting bracket shown in FIGS. 4 and 5A.
Figure 5C:
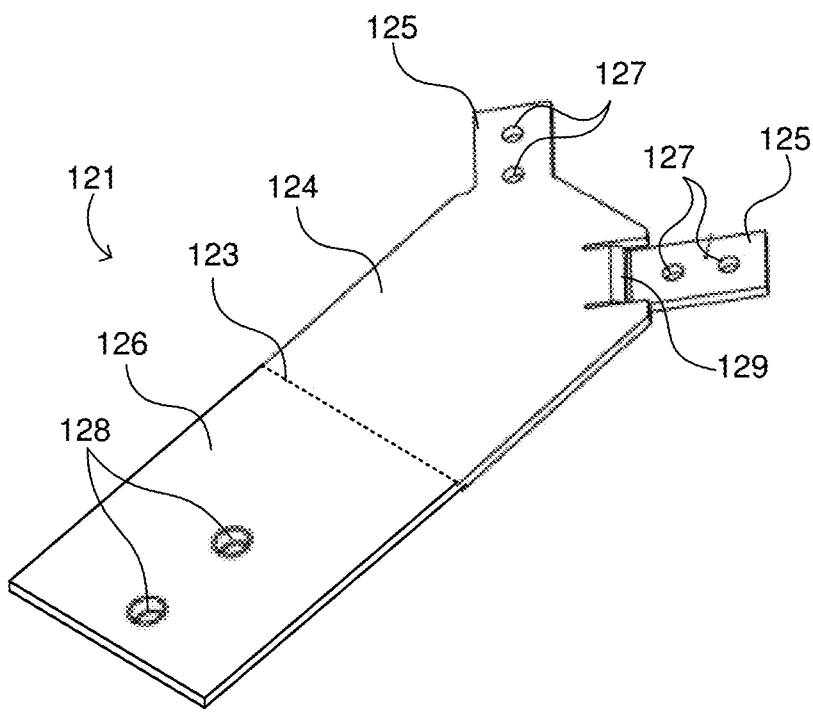
FIG. 5C is a perspective view of a blank that is cut or stamped from a sheet of metal or alloy and thereafter bent to provide the second mounting bracket shown in FIGS. 4 and 5A.

FIG. 5A is a perspective view of the first and second mounting brackets 112, 122. FIG. 5B is a perspective view of a blank 111 that is cut (e.g., laser cut or mechanically cut) or stamped from a sheet of metal or alloy and thereafter bent (along the dotted line 113) to provide the first mounting bracket 112. FIG. 5C is a perspective view of a blank 121 that is cut or stamped from a sheet of metal or alloy and thereafter bent (along the dotted line 123) to provide the second mounting bracket 124. Referring to FIG. 5B, a portion of the blank 111 that is on one side of the bend (along the dotted line 113) forms the first support shelf 114, and another portion of the blank 111 that is on the other side of the bend (along the dotted line 113) forms the first support arm 116. Referring to FIG. 5C, a portion of the blank 121 that is on one side of the bend (along the dotted line 123) forms the second support shelf 124, and another portion of the blank 121 that is on the other side of the bend (along the dotted line 123) forms the second support arm 126. Metal-working machines that can be used to bend the blanks 111 and 121 are often referred to as brakes, bending machines, bending breaks, sheet metal folders, or folders. The blanks 111, 121 can be cut or stamped from the same sheet of metal or alloy, or from separate sheets of metal or alloy. Such cutting can be performed by laser cutting, mechanical cutting, or milling, but is not limited thereto. The various through-holes can be drilled (e.g., by a drill press) or otherwise made (e.g., using a laser) in the blanks 111 and 121 before they are bent, or after they are bent, and may even be drilled or otherwise made before the blanks 111, 121 are cut or stamped from one or more sheet(s) of metal or alloy. FIGS. 5A, 5B and 5C can also be referred to collectively herein as FIG. 5.

As shown in FIGS. 4, 5A and 5B, the first support shelf 114 includes a pair of brace support elements 115 that are shown as extending outward from distal corner regions of the first support shelf 114. Each of the brace support elements 115 is shown as including a pair of through-holes 117. As shown in FIGS. 4, 5A and 5C, the second support shelf 124 includes a pair of brace support elements 125 that are shown as extending outward from distal corner regions of the second support shelf 124. Each of the brace support elements 125 is shown as including a pair of through-holes 127.

As shown in FIGS. 4 and 5, the first support arm 116 includes a pair of through-hole 118 having a center-to-center distance that is the same as a center-to-center distance between a pair of through-holes 128 in the second support arm 126. The first and second mounting brackets 112, 122 are configured such that the first and second support shelves 114 and 124 collectively provide the contiguous and planar support surface 104 when the first and second support arms 116, 126 are placed back-to-back against one another.

Referring to FIG. 4A, the security apparatus 102 is also shown as including a first neck portion 154 and a second neck portion 156, which are parts or portions of a neck 152. The first neck portion 154 includes a pair of bolts 181 and the second neck portion 156 including a pair of through-holes 183. A center-to-center distance between the pair of bolts 181 is the same as the center-to-center distance between the pair of through-holes 183, which are also the same as the center-to-center distance between the through-holes 118 of the first support arm 116 and the center-to-center distance between the through-holes 128 of the second support arm 126.

In the embodiment shown, the first and second neck portions 154, 156 are configured to be secured to one another with the first and second support arms 116, 126 sandwiched between the first and second neck portions 154, 156. While substantially the entire first and second support arms 116, 126 are sandwiched between the first and second neck portions 154, 156 in the embodiment shown, it would also be possible that only smaller portions of the support arms 116, 126 are sandwiched between the neck portions 154, 156. In the embodiment shown, the bolts 181 that extend from the first neck portion 154 are aligned with and pass through the through-holes 128 of the second support arm 126, the through-holes 118 of the first support arm 116, and the through-holes 183 of the second neck portion 156, and then are secured to one another using nuts 182 (e.g., wing-nuts) and the bolts 181, or some other type of fasteners (besides nuts and bolts). In an alternative embodiment, both of the neck portions 154, 156 include respective through-holes, a pair of bolts are passed through the through-holes of the neck portions 154, 156, which are sandwiched around the first and second support arms 116, 126, and nuts and bolts are used to secure that neck portions 154, 156 and the support arms 116, 126 to one another. Alternative embodiments can include more or less than two through-holes and two bolts. The bolts 181 and nuts 182 can be referred to collectively as fasteners 180 or fastener hardware. Other types of fasteners can alternatively or additionally be used. The first and second neck portions 154, 156 cannot be seen in many of the FIGS., such as FIGS. 1-3, because they are covered by a collar 162 that is configured to be slid over and encase peripheries of the first and second neck portions 154, 156 while the first and second support arms 116, 126 are sandwiched between the first and second neck portions 154, 156.

In accordance with certain embodiments, the fasteners 180, which are used to secure the first and second neck portions 154, 156 to one another, are covered by the collar 162 after the collar 162 has been slid over and encases the peripheries of the first and second neck portions 154, 156. This makes the fasteners inaccessible to a potential thief while the collar 162 encases the peripheries of the first and second neck portions 154, 156. As shown in FIG. 4A an opening 163 can be included in the collar 162 to allow a power cord to pass therethrough to allow a secured portable electronic device to be powered and/or charged by plugging the power cord into an electric socket (not shown) located under a tabletop. A portion of the such a power cord can be threaded through the collar such that it is between the collar and the neck.

As shown in FIGS. 1, 2B, 3 and 4A, one or more bolts 190 (or other types of fasteners) extend from the distal end of each of the first and second neck portions 154, 156. As can be seen from the side view in FIG. 3, while the collar 162 is encasing the peripheries of the first and second neck portions 154, 156, the bolts 190 extend downward from the neck 152 (and more specifically, from distal ends of the first and second neck portions 154, 156) thereby enabling the bolts 190 to be inserted into through-holes in a tabletop 206 of a display table. Nuts 192 (e.g., wingnuts) and/or other fastener hardware can then be used to secure the security apparatus 102 to the tabletop 206 from the underside of the tabletop 206. Preferably, the underside of the tabletop 206 is made inaccessible to customers and potential thieves in a retail store, e.g., by being encased in a locked enclosure. This way potential thieves cannot remove the security apparatus 102 from the display table, and thus, could not steal the portable electronic device that is secured to the display table by the security apparatus 102. Further, while the security apparatus 102 is secured to a display table, the collar 162 cannot be removed, and thus, a potential thief cannot access the fasteners (e.g., the bolts 181 and the nuts 182 shown in FIG. 4) that keep the first and second neck portions 154, 156 secured to one another with the first and second support arms 116, 126 sandwiched between the first and second neck portions 154, 156.

In FIG. 4A, a first pair of bolts 190 are shown extending directly from the distal end of the first neck portion 154, and a second pair of bolts 190 are shown as extending directly from the distal end of the second neck portion 156. More or less bolts may extend from each of the neck portions 154, 156. In an alternative embodiment of the security apparatus 102 in FIG. 4B, the distal ends of the first and second neck portions 154, 156 include through holes to which a neck base 187 can be attached (e.g., using bots and nuts or other types of fasteners), and bolts 190 (or other types of fasteners) extend from the neck base 187. After the neck base 187 is attached to the first and second neck portions 154, 156 the collar 162 is used to encase the peripheries of the first and second neck portions 154, 156 and the neck base 187, after which the bolts 190 will extend downward beyond the collar 162 to allow the security apparatus 102 to be attached to a tabletop or to another display surface. In FIG. 4B, the neck base 187 is shown as including four bolts 190 extending downward therefrom. In alternative embodiments, the neck base 187 can include more or less than four bolts 190, e.g., just two or three bolts 190, or more than four bolts.

Figure 4C:
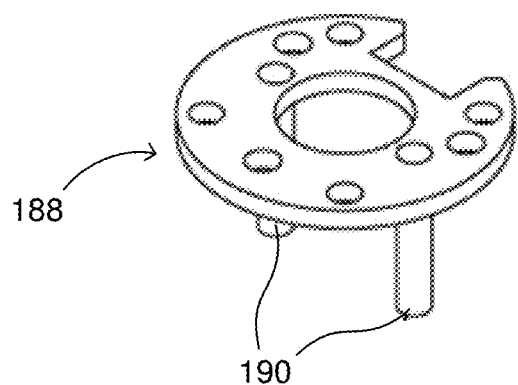
FIGS. 4C and 4D show alternative types of neck bases that can be attached to the first and second neck portions of the security apparatus.
Figure 4D:
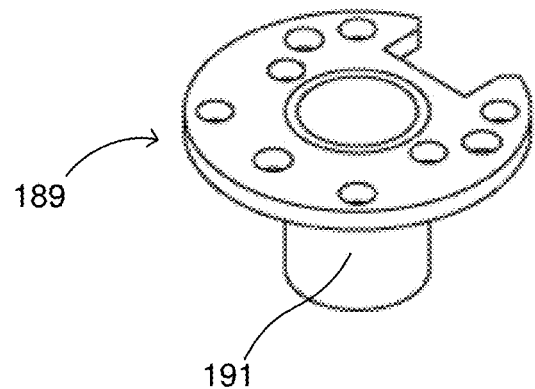

FIGS. 4C and 4D show alternative types of neck bases that can be attached to the first and second neck portions 154, 156 of the security apparatus 102, in place of the neck base 187 shown in FIG. 4B. More specifically, FIG. 4C shows a neck base 188 that includes two bolts 190 that are in-line with another and can be used to secure the security apparatus 102 to a tabletop or other display surface that includes one or more slots into which the bolts 190 can be inserted and secured from the underside or backside of the tabletop or other display surface, e.g., using wingnuts or other types of nuts. The bolts 190 shown in FIG. 4C can alternatively be inserted into through holes rather than slots in a tabletop or other display surface. After the neck base 188 is attached to the first and second neck portions 154, 156 the collar 162 is used to encase the peripheries of the first and second neck portions 154, 156 and the neck base 188, after which the bolts 190 will extend downward beyond the collar 162 to allow the security apparatus 102 to be attached to a tabletop or to another display surface.

FIG. 4D shows a neck base 189 that includes a single cylindrical threaded rod 191 that can be inserted into a hole in a tabletop or other display surface and secured from the underside or backside of the tabletop or other display surface, e.g., using an appropriately sized wingnut or other type of nut or fastener. The diameter of the threaded rod 191 can be, e.g., between 0.5 inches and 0.75 inches, but is not limited thereto. After the neck base 189 is attached to the first and second neck portions 154, 156 the collar 162 is used to encase the peripheries of the first and second neck portions 154, 156 and the neck base 189, after which the threaded rod 191 will extend downward beyond the collar 162 to allow the security apparatus 102 to be attached to a tabletop or to another display surface. FIGS. 4A through 4D can be referred to collectively as FIG. 4, as noted above. In FIG. 4, and other FIGS., to avoid clutter and complexity in the drawings, the threads on the outer circumferences of the bolts 190 and the rod 191 are not shown. The bolts 190 and the rod 191 are examples of fasteners extending from or attached to a distal end of at least one of the neck portions 154, 156, and configured to be used to secure the security apparatus 102 to a tabletop of a display table or to another display surface.

Referring again to FIG. 4B, also show therein is a SIM card protector arm 130 can be added to any embodiment of the security apparatus 102 to cover a SIM card slot on a mobile phone (wherein the acronym SIM stands for subscriber identification module) that is being secured by the security apparatus 102, so at to prevent a thief from steeling a SIM card from a displayed mobile phone. In FIG. 4B, the SIM card protector arm 130 is shown as being L-shaped end extending from the right side of the support shelf 124. However, the precise dimensions and location of the SIM card protector arm 130 may depend on the specific phone for which the security apparatus 102 is being used to secure, and more specifically, the location of the SIM card slot on the mobile phone. Instead of being attached to the support shelf 124 (or the support shelf 114), the SIM card protector arm 130 can alternatively be integrally formed with the support shelf 124 or the support shelf 114, in alternative embodiments. While only shown in FIG. 4B, a SIM card protector arm (the same or similar to the arm 130) can be added to or included in any of the embodiments described herein.

Each of the elements of the security apparatus 102, including, but not limited to, the first and second mounting brackets 112, 122, the brace elements 132, the first and second neck portions 154, 156, and the collar 162, are preferably made of a strong metal or alloy (aka metal/alloy) so that the security apparatus 102 is sturdy and cannot be readily bent, cut through, or otherwise broken or tempered with. For example, such elements can be made of steel. Different elements of the security apparatus 102 can be made of the same metal/alloy or different metals/alloys than other elements. All or subsets of such elements can be painted, powder coated, or otherwise covered to have any desired color and appearance. Certain elements of the security apparatus 102 can be molded and/or machined, such as the brace elements 132. Other elements of the security apparatus 102, such as the mounting brackets 112, 122, can be made from blanks that are cut (e.g., laser cut or mechanically cut) or stamped from a sheet of metal/alloy, and then bent into a desired final configuration. The through-holes (e.g., 118, 128) in the mounting brackets 112, 122 can be made before or after the aforementioned bending, as noted above.

Each brace element 132, which can also be referred to more succinctly as a brace 132, includes a respective corner element 134 and a respective attachment element 136 (e.g., shown in FIGS. 2 and 6A-6D). Each of the corner elements 134 is configured to be placed over a respective one of four corners of a rectangular shaped portable electronic device, such as the mobile phone 204 represented in dotted line in FIG. 1. Such rectangular shaped portable electronic devices can have sharp corners, but more likely, will have rounded corners, but nevertheless are considered rectangular shaped.

Figure 6A:
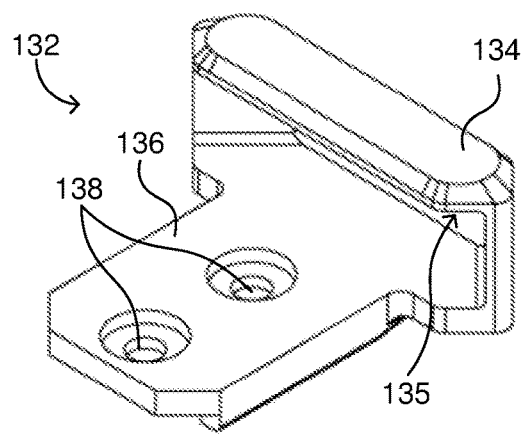
FIGS. 6A, 6B, 6C, 6D and 6E are, respectively, front perspective, front, side, top, and bottom views of a brace element according to an embodiment of the present technology.
Figure 6B:
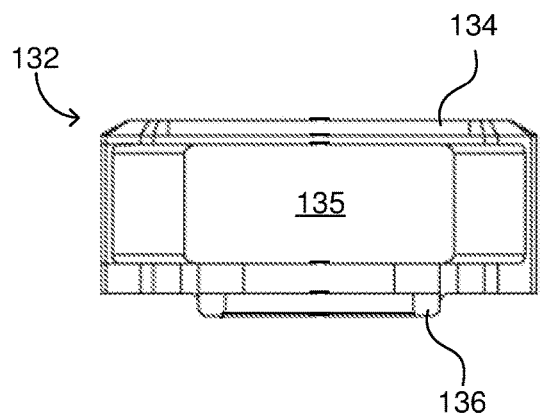
Figure 6C:
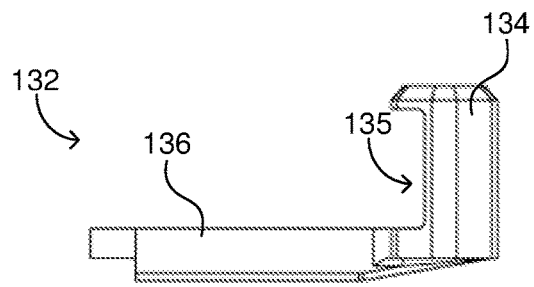
Figure 6D:
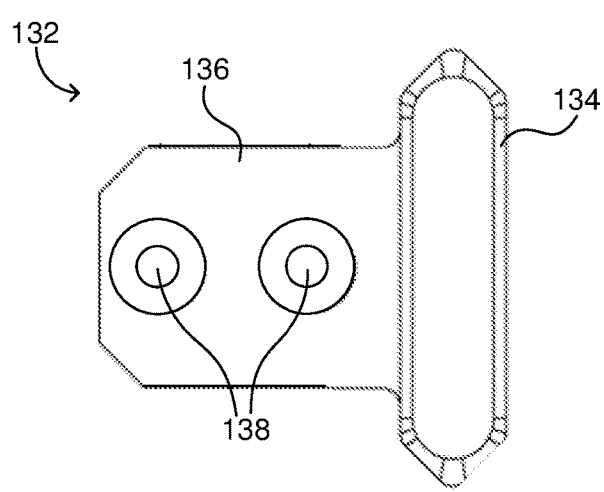
Figure 6E:
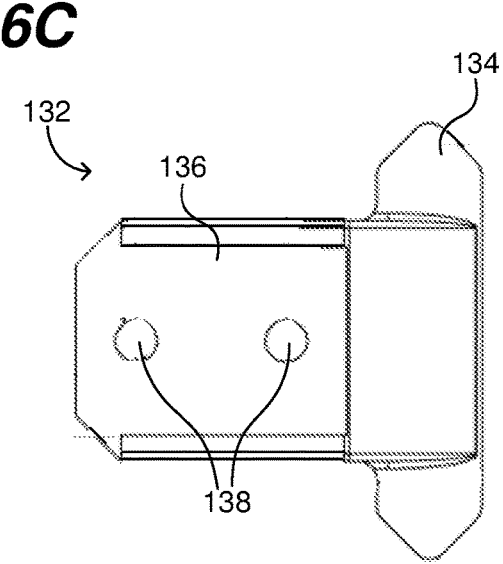

Each corner element 134 provides a pocket into which a corner of a rectangular shaped portable electronic device can be inserted and held. In the embodiment shown, each corner element 134 includes a corner opening 135 (as shown in FIGS. 6A-6C) that enables a portion of a corner of the rectangular shaped portable electronic device to be seen, but that need not be the case. In other words, an alternative corner element of a brace element 132 may not enable a portion of a corner of the rectangular shaped portable electronic device to be seen. The actual form factor of the corner element 134 can be changed in a variety of different manners while still achieving its function of holding at least a portion of a corner portion of a rectangular shaped portable electronic device, to enable the portable electronic device to be secured to the security apparatus 102.

In the embodiment shown, each of the corner elements 134 wraps around portions of two adjacent sides of a rectangular shaped portable electronic device at or nears its corner. For example, the corner element 134 of the brace element 132a wraps around portions of the left and bottom sides of a rectangular shaped portable electronic device near its lower left corner. For another example, the corner element 134 of the brace element 132d wraps around portions of the right and top sides of a rectangular shaped portable electronic device near its upper right corner. Each of the attachment elements 136 is configured to be attached to one of the brace support elements 115 or 125 of one of the mounting brackets 112, 122. In certain embodiments, the attachment element 136 of a brace element 132 can be attached to a brace support element 115 or 125 (of one of the support shelves 114, 124) using rivets or other types of fasteners, such as screws, or nuts and bolts, but are not limited thereto. Alternatively, or additionally, an adhesive can be used to attach the attachment element 136 of a brace element 132 to a brace support element 115 or 125 (of one of the support shelves 114, 124). Alternatively, or additionally, welding or brazing can be used to attach the attachment element 136 of a brace element 132 to a brace support element 115 or 125 (of one of the support shelves 114, 124). It would also be possible to design and manufacture the attachment elements 136 (of the brace support elements) and the brace support elements 115 or 125 to mechanically inter-lock with one another, e.g., using notches and slots, and/or the like.

The brace element 132a can also be referred to as a first brace element 132a or a lower left brace element 132a; the brace element 132b can also be referred to as a second brace element 132b or a lower right brace element 132b; the brace element 132c can also be referred to as a third brace element 132c or an upper left brace element 132c; and the brace element 132d can also be referred to as a fourth brace element 132d or an upper right brace element 132d. Additional details of a brace element 132 are described below with reference to FIGS. 6A-6E.

FIGS. 6A, 6B, 6C, 6D and 6E are, respectively, front perspective, front, side, top, and bottom views of one of the brace elements 132 according to an embodiment of the present technology. As noted above, each brace element 132 includes a corner element 134 and an attachment element 136. The corner element 134 and the attachment element 136 of each brace element 132 can be integrally formed, or can be separately formed and attached to one another by welding and/or fasteners. Each brace element (or just the corner element 134 thereof) can be cast, molded and/or machined. Alternatively, the brace elements, and the corner elements thereof, can be integrally formed, e.g., by bending an appropriately stamped or cut metal/alloy blank, or can be formed of multiple pieces welded or otherwise attached to one another. Similarly, each attachment element 136 can be integrally formed, or can be formed of multiple pieces welded or otherwise attached to one another, as can be appreciated from the drawings. Further elements of the security apparatus 102 can be cast, molded and/or machined, and/or made in a variety of different manners.

In the embodiment shown, the attachment element 136 includes a pair of recessed through-holes 138 that are used to attach the brace element 132 to one of the brace support elements 115, 125 of one of the mounting brackets 112, 122 (and more specifically, one of the support shelves 114, 124 thereof). For example, rivets, screws, nuts and bolts, or the like, can be inserted through the through-holes of the brace attachment element 136 and the brace support elements 115, 125. Other variations are also possible, as noted above.

The security apparatus 102 described above and shown in FIGS. 1-5 was shown and described as securing all four corners of a rectangular shaped portable electronic device, using four brace elements 132 and four corner element 134 thereof. In alternative embodiments, a security apparatus can secure just two of the four corners of a rectangular shaped portable electronic device, using two brace elements (e.g., 132a and 132d, or 132b and 132c) and two corner elements 134 thereof. In such a case, corners (of a rectangular shaped portable electronic device) that are diagonal to one another should be secured using the security apparatus. In other embodiments, a security apparatus can secure just three of the four corners of a rectangular shaped portable electronic device, using three brace elements 132 and three corner elements 134 thereof, in which case, one of the four corners of the rectangular shaped portable electronic device will not be secured by the security apparatus. With any of the above described variations, a potential thief should not be able to remove a portable electronic device that is secured to a display table using one of the security apparatuses.

As noted above, in accordance with the embodiments described herein, certain components of the quickly customizable security apparatus 102 can be used regardless of the size of the portable electronic device (e.g., mobile phone) with which the security apparatus is intended to be used, while other components of the quickly customizable security apparatus are designed such that they can be manufactured and assembled with a very short lead-time (e.g., in just a few days, and likely in just a few hours). The components that can be used regardless of the size of the portable electronic device with which the security apparatus is intended to be used can be referred to herein as universal components. The components that are designed such that they can be manufactured and assembled with a very short lead-time (e.g., in just a few days, and likely in just a few hours) can be referred to herein as quickly manufacturable customized components, or more succinctly, as customized components. Examples of universal components include, but are not limited to, the first and second neck portions 154, 156 and the collar 162. Examples of the customized components include, but are not limited to, the first and second mounting brackets 112 and 122. The first mounting bracket 112 includes certain components, such as the first support shelf 114 and the first support arm 116, which are also examples of customized components. The second mounting bracket 122 includes certain components, such as the second support shelf 124 and the second support arm 126, which are also examples of customized components. There are also certain components of the quickly customizable security apparatus 102, such as the corner elements 134 (or the entirety of the brace elements 132) that can be manufactured such that they can be used with portable electronic devices within a certain range of thicknesses, wherein such components can be referred to as selectable standard components. For example, a first sized bracket can include a corner element for use with portable electronic devices having a thickness in the range of 4.6 millimeters (mm) to 6.5 mm; a second sized bracket can include a corner element for use with portable electronic devices having a thickness in the range of 6.6 mm to 8.5 mm; and a third sized bracket can include a corner element for use with portable electronic devices having a thickness in the range of 8.6 mm to 10.5 mm. These are just examples, which are not meant to be all encompassing.

Referring briefly back to FIGS. 1, 4, 5A, and 5C, a portion of the second support shelf 124, which is labeled 129, is shown as being bent and set back to accommodate a protruding camera lens of a portable electronic device. Depending on the location of such a protruding camera lens, another way to accommodate a protruding camera lens (or some other protruding feature) can be to include an opening through a portion of one of the support shelves 114, 124. Other custom features can also be made to accommodate a specific design of a specific model of a specific portable electronic device.

In accordance with certain embodiments of the present technology, a company that makes and sells security apparatuses, such as the quickly customizable security apparatus 102, can stock the universal components in a single color (e.g., white) with a single finish (matte), or in multiple colors (e.g., white, black, and silver) and/or multiple finishes (e.g., matte, glossy, and semi-gloss). The company can also stock the selectable standard components in each of a plurality of sizes, in a single color and a single finish, or in multiple different colors and/or multiple different finishes. Thereafter, as soon as the dimensions of a new model of a mobile phone (or other portable electronic device) are released by the seller of the mobile phone (or other portable electronic device), the company that makes and sells security apparatuses can quickly design the custom components, e.g., using computer aided design software, or the like, and then use computer controlled cutting or stamping equipment to quickly cut custom blanks (e.g., the same as or similar to the blanks 111 and 121 shown in FIGS. 5B and 5C), and then add holes and/or bends to the blanks as appropriate to produce custom brace support elements (the same as or similar to the brace support elements 115, 125). It is also noted that even the so called universal components can come in different sizes, e.g., different length neck portions and different length collars, so that a retail store that orders a quickly customizable security apparatus (e.g., 102) can display portable electronic devices in their preferred manner.

In accordance with certain embodiments of the present technology, a company that makes and sells security apparatuses, such as the quickly customizable security apparatus 102, may receive an order for a specific quantity of quickly customizable security apparatus that are customized to hold a specific model of a specific company's portable electronic device. For example, a big-box store may order two hundred security apparatuses that are intended to be used to display and secure the latest model of a tablet computer in two hundred of the big-box store's locations. The company that makes and sells the security apparatuses, or a subcontractor, or the like, can complete the order by selecting certain components from their stock of universal components and their stock of selectable standard components, and the company can quickly design and make the custom components (e.g., the mounting brackets), and then ship the components along with assembly instructions to the big-box store. Where certain components are to be secured to other components (e.g., brace elements 132 are to be secured to brace support elements 115 and 125), the company that makes and sells the security apparatuses can appropriately attach such elements to one another, or use a subcontractor, or the like, to perform such tasks, prior to such components being shipped to the big-box store or other type of retail store.

All of the components that are needed to assemble a single security apparatus (e.g., 102) that is for using in securing a single portable electronic device (e.g., mobile phone) to a display table can be shipped in a single unit box or bag, and a plurality of such single unit boxes or bags can be shipped in a larger box or bag. Assembly instructions can be included in each single unit box or bag, or just in the larger box or bag that includes multiple such single unit boxes or bags. Referring briefly back to FIG. 4, all the components shown therein can be placed in a single unit box or bag. Preferably, the brace elements 132 should already be secured to the brace support elements 115 and 125 of the support shelves 114 and 124 before such elements are placed in a single unit box or bag and shipped to a retail store.

After a retail store receives their shipment of security apparatuses (e.g., 102), a worker can open a single unit box or bag and remove the components thereof. In order to secure a portable electronic device (e.g., a mobile phone) to a display table, the worker will maneuver the first support shelf 114 relative to the lower side of the device (e.g., mobile phone) such that the lower left and right corners of the device fit within the corner elements 134 of the brace elements 132a and 132b, and will maneuver the second support shelf 124 relative to the upper side of the device such that the upper left and right corners of the device fit within the corner elements 134 of the brace elements 132c and 132d. At that point, the first and second support arms 116, 126 should be adjacent to one another with their through-holes 118, 128 aligned with one another. The bolts 181 extending from the neck portion 154 (or other fasteners) are then inserted through the through-holes 118, 128 in the support arms 116, 126, as well as through the through-holes 183 of the other neck portion 152, and then nuts (e.g., wing-nuts 182) can be used to secure the neck portions 152 and 154 to one another with the first and second support arms 116, 126 sandwiched therebetween. Thereafter, the collar 162 is slid over the first and second neck portions 152 and 154, after which the bolts 190 will extend downward beyond the collar 162. The bolts 190 can then be inserted into through-holes in a tabletop (e.g., 206 in FIG. 3) of a display table. As shown in FIG. 3, nuts 192 (e.g., wingnuts) can then be used to secure the security apparatus 102 to the tabletop 206 from the underside of the tabletop 206.

Figure 7:
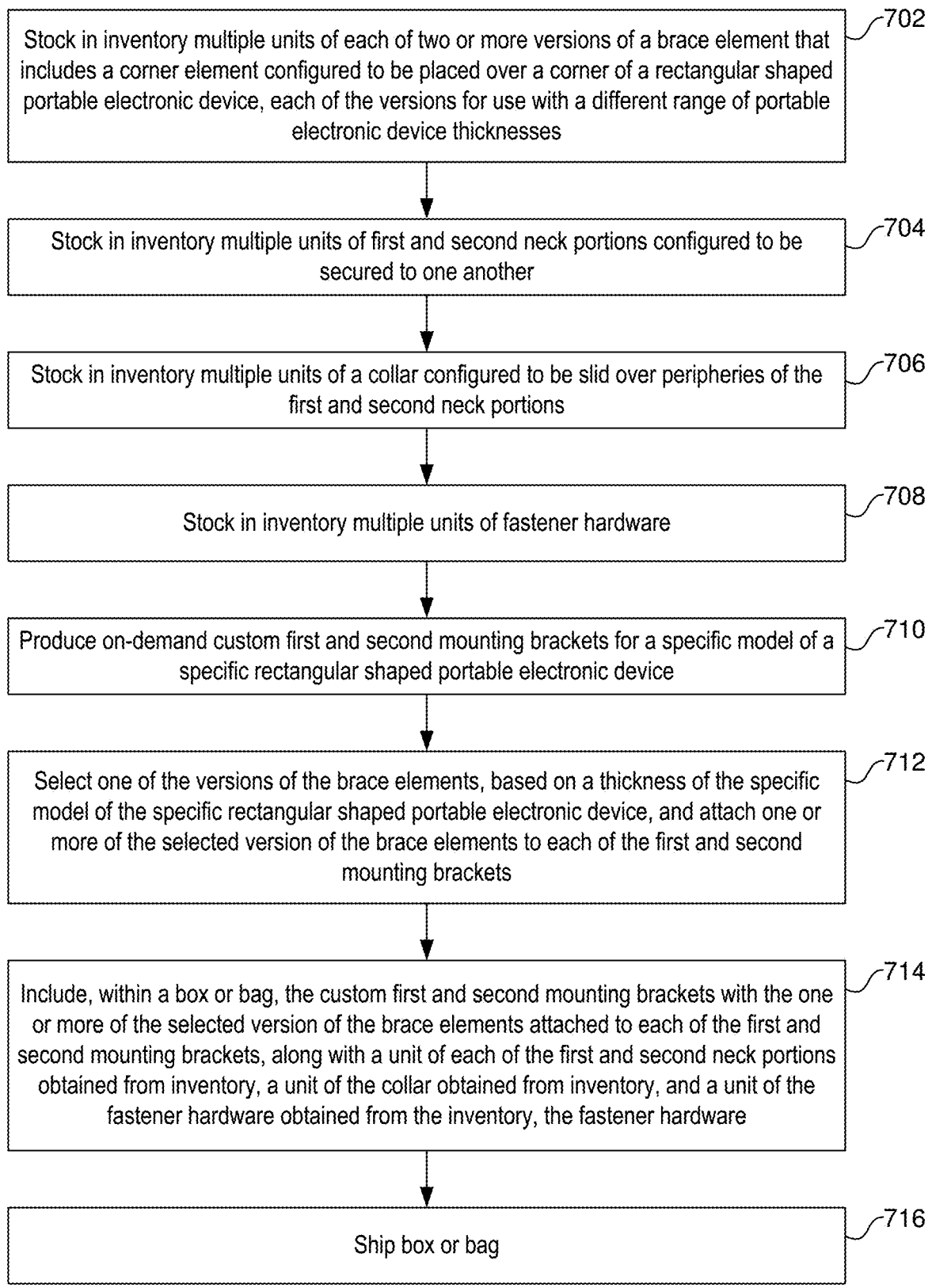
FIG. 7 is a high level flow diagram used to summarize methods, according to certain embodiments of the present technology, for providing a security apparatus that can be used to secure a rectangular shaped portable electronic devices to a tabletop of a display table or to another display surface.

The high level flow diagram of FIG. 7 will now be used to summarize methods, according to certain embodiments of the present technology, for providing a security apparatus that can be used to secure a rectangular shaped portable electronic devices to tabletop of a display table or to another display surface.

Referring to FIG. 7, step 702 involves stocking in inventory multiple units of each of two or more versions of a brace element (e.g., 132) that includes a corner element (e.g., 134) configured to be placed over a corner of a rectangular shaped portable electronic device, wherein each of the versions is for use with a different range of portable electronic device thicknesses. For example, a first version of the brace element (e.g., 132) can include a corner element (e.g., 134) for use with portable electronic devices having a thickness in the range of 4.6 millimeters (mm) to 6.5 mm; a second version of the brace element can include a corner element for use with portable electronic devices having a thickness in the range of 6.6 mm to 8.5 mm; and a third version of the brace element can include a corner element for use with portable electronic devices having a thickness in the range of 8.6 mm to 10.5 mm. These are just examples, which are not meant to be all encompassing.

Step 704 involves stocking in inventory multiple units of first and second neck portions (e.g., 154, 156) configured to be secured to one another. Step 706 involves stocking in inventory multiple units of a collar (e.g., 162) configured to be slid over peripheries of the first and second neck portions. Step 708 involves stocking in inventory multiple units of fastener hardware (e.g., 182, 192, etc.).

Still referring to FIG. 7, step 710 involves producing on-demand custom first and second mounting brackets (e.g., 112 and 122) for a specific model of a specific rectangular shaped portable electronic device. Step 710 can include using computer aided design software to design patterns for first and second blanks (e.g., 111 and 121) based on dimensions for the specific model of the specific rectangular shaped portable electronic device. Step 710 can also include cutting or stamping a first blank (e.g., 111) from a sheet of metal or alloy, and cutting or stamping a second blank (e.g., 121) from a sheet of metal or alloy, which can be the same or different from the sheet from which the first blank is cut or stamped. Step 710 can further include bending the first blank (e.g., 111) to form a first support shelf (e.g., 114) and a first support arm (e.g., 116) that is at a first angle (e.g., 60 degrees) relative to the first support shelf, as well as bending the second blank (e.g., 121) to form a second support shelf (e.g., 124) and a second support arm (e.g., 126) that is at a second angle (e.g., 120 degrees) relative to the second support shelf. Further, prior to bending the first and second blanks, holes (e.g., 117, 127) may be drilled in portions of the first and second blanks (e.g., 111, 121) that will comprise brace support element portions (e.g., 115, 125) of the first and second support shelves, and further holes (e.g., 118, 128) may be drilled in portions of the first and second blanks (e.g., 111, 121) that will comprise the support arms (e.g., 116, 126).

Step 712 involves selecting one of the versions of the brace elements (e.g., 132), based on a thickness of the specific model of the specific rectangular shaped portable electronic device, and attaching one or more of the selected version of the brace elements to each of the first and second mounting brackets. For example, if the thickness of the specific model of the specific rectangular shaped portable electronic device is 7.2 mm, then the version of the brace element including the corner element for use with devices having a thickness of 6.6 mm to 8.5 mm may be selected. The attaching can be performed, e.g., using rivets or other fasteners inserted through the holes (e.g., 117, 127) in the portions of the first and second blanks (e.g., 111, 121) that comprise brace support element portions (e.g., 115, 125) of the first and second support shelves (e.g., 114, 124), and through corresponding holes (e.g., 138) in attachment elements (e.g., 136) of the brace elements (e.g., 132). Other ways of attaching brace element 132 to the brace support portions, e.g., using notches and slots, an adhesive, welding, brazing, etc., may alternatively or additionally be used.

Step 714 involves including, within a box or bag, the custom first and second mounting brackets with the one or more of the selected version of the brace elements attached to each of the first and second mounting brackets, along with a unit of each of the first and second neck portions obtained from inventory, a unit of the collar obtained from inventory, and a unit of the fastener hardware obtained from the inventory. Such fastener hardware is for use in securing portions of the custom first and second mounting brackets between the units of the first and second neck portions, as well as for attaching the security apparatus as a whole to a tabletop of display table or to another display surface.

Step 716 involves shipping the box or bag, which includes the custom first and second mounting brackets with the one or more of the selected version of the brace element attached to each of the first and second mounting brackets, along with the unit of each of the first and second neck portions obtained from inventory, the unit of the collar obtained from inventory, and the unit of the fastener hardware obtained from inventory.

The security apparatuses of the embodiments of the present technology can be used to secure portable electronic devices to other display surfaces besides a horizontal display table. For example, such apparatuses can also be used to secure portable electronic devices to vertical display wall, if desired, or more generally, to any one of various different types of display surfaces.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing a security apparatus that can be used to secure a rectangular shaped portable electronic device to a display surface, the method comprising:

obtaining dimensions for a specific model of the specific rectangular shaped portable electronic device;

selecting a version of a brace element, from inventory thereof, based on a thickness of the specific model of the specific rectangular shaped portable electronic device; and producing custom first and second mounting brackets for the specific model of the specific rectangular shaped portable electronic device, by using computer aided design software to design a first pattern for a first blank and a second pattern for a second blank based on the dimensions for the specific model of the specific rectangular shaped portable electronic device;

cutting or stamping the first blank from a sheet of metal or alloy based on the first pattern;

cutting or stamping the second blank from a sheet of metal or alloy based on the second pattern;

bending the first blank to form the first mounting bracket;

bending the second blank to form the second mounting bracket; and attaching one or more of the selected version of the brace element to each of the first and second mounting brackets;

including, within a box or bag, the custom first and second mounting brackets with the one or more of the selected version of the brace element attached to each of the first and second mounting brackets, along with first and second neck portions obtained from inventory thereof, a unit of a collar obtained from inventory thereof, and a unit of fastener hardware obtained from inventory thereof, the fastener hardware for use in securing portions of the custom first and second mounting brackets between the first and second neck portions and for use in securing the security apparatus to a display surface.

2. The method of claim 1, wherein:
the bending the first blank to form the first mounting bracket comprises bending the first blank to form a first support shelf and a first support arm that is at a first angle relative to the first support shelf, the first support shelf and the first support arm comprising parts of the first mounting bracket; and
the bending the second blank to form the second mounting bracket comprises bending the second blank to form a second support shelf and a second support arm that is at a second angle relative to the second support shelf, the second support shelf and the second support arm comprising parts of the second mounting bracket.

3. The method of claim 2, wherein:
each of the custom first and second mounting brackets for the specific model of the specific rectangular shaped portable electronic device, after the bending of the first and second blanks, comprises a respective brace support element portion and a respective support arm;
the producing the custom first and second mounting brackets for the specific model of the specific rectangular shaped portable electronic device, further comprises, prior to bending the first and second blanks, drilling holes in portions of the first and second blanks that will comprise brace support element portions of the first and second support shelves, and drilling further holes in portions of the first and second blanks that will comprise the support arms; and
the attaching the at least one of the selected version of the brace element to each of the first and second support shelves comprises inserting rivets or other fasteners through the holes in the portions of the first and second blanks that comprise brace support element portions of the first and second support shelves, and through corresponding holes in an attachment element of each said selected version of the brace element.

4. The method of claim 1, wherein:
the fastener hardware selected from inventory thereof is for use in securing portions of the custom first and second mounting brackets between portions of the neck and for use in securing the security apparatus to a display surface.

5. The method of claim 1, further comprising:
stocking in inventory multiple units of each of two or more versions of the brace element that includes a corner element configured to be placed over a corner of a rectangular shaped portable electronic device, each of the versions for use with a different range of portable electronic device thicknesses;
stocking in inventory multiple units of each of the first and second neck portions;
stocking in inventory multiple units of the collar configured to be slid over peripheries of the first and second neck portions; and
stocking in inventory multiple units of the fastener hardware.

6. The method of claim 1, further comprising:
shipping the box or bag, which includes the custom first and second mounting brackets with the one or more of the selected version of the brace element attached to each of the first and second mounting brackets, along with the first and second neck portions obtained from inventory, the unit of the collar obtained from inventory, and the unit of the fastener hardware obtained from inventory.

7. The method of claim 1, further comprising:
stocking in inventory multiple units of each of two or more versions of a neck base that can be attached to the first and second neck portions and is used to attach the security apparatus to a display surface;
selecting one of the versions of the neck base; and
including, within the box or bag, the selected version of the neck base.

8. The method of claim 7, wherein the selecting one of the versions of the neck base is based on a customer request.

9. The method of claim 8, wherein:
a first said version of the neck base includes a plurality of bolts; and
a second said version of the neck base includes a single cylindrical threaded rod.

10. The method of claim 1, wherein the rectangular shaped portable electronic device that the apparatus can be used to secure to a display surface comprises a mobile phone or a tablet computer.

11. A method of providing a security apparatus that can be used to secure a rectangular shaped portable electronic device to a display surface, the method comprising:
stocking in inventory multiple units of each of two or more versions of a brace element that includes a corner element configured to be placed over a corner of a rectangular shaped portable electronic device, each of the versions for use with a different range of portable electronic device thicknesses;
stocking in inventory multiple units of first and second neck portions configured to be secured to one another;
stocking in inventory multiple units of a collar configured to be slid over peripheries of the first and second neck portions;
stocking in inventory multiple units of fastener hardware;
producing on-demand custom first and second mounting brackets for a specific model of a specific rectangular shaped portable electronic device;
selecting one of the versions of the brace element, based on a thickness of the specific model of the specific rectangular shaped portable electronic device, and attaching one or more of the selected version of the brace element to each of the first and second mounting brackets; and
including, within a box or bag, the custom first and second mounting brackets with the one or more of the selected version of the brace element attached to each of the first and second mounting brackets, along with a unit of each of the first and second neck portions obtained from inventory, a unit of the collar obtained from inventory, and a unit of the fastener hardware obtained from inventory, the fastener hardware for use in securing portions of the custom first and second mounting brackets between the units of the first and second neck portions and for use in securing the security apparatus to a display surface.

12. The method of claim 11, wherein the producing the custom first and second mounting brackets for the specific model of the specific rectangular shaped portable electronic device, comprises:
cutting or stamping a first blank from a sheet of metal or alloy;
cutting or stamping a second blank from a sheet of metal or alloy;

bending the first blank to form a first support shelf and a first support arm that is at a first angle relative to the first support shelf, the first support shelf and the first support arm comprising parts of the first mounting bracket; and bending the second blank to form a second support shelf and a second support arm that is at a second angle relative to the second support shelf, the second support shelf and the second support arm comprising parts of the second mounting bracket.

13. The method of claim 12, wherein:

each of the custom first and second mounting brackets for the specific model of the specific rectangular shaped portable electronic device, after the bending of the first and second blanks, comprises a respective brace support element portion and a respective support arm;

the producing the custom first and second mounting brackets for the specific model of the specific rectangular shaped portable electronic device, further comprises, prior to bending the first and second blanks, drilling holes in portions of the first and second blanks that will comprise brace support element portions of the first and second support shelves, and drilling further holes in portions of the first and second blanks that will comprise the support arms; and the attaching the at least one of the selected version of the brace element to each of the first and second support shelves comprises inserting rivets or other fasteners through the holes in the portions of the first and second blanks that comprise brace support element portions of the first and second support shelves, and through corresponding holes in attachment elements of the brace elements.

14. The method of claim 12, further comprising:

using computer aided design software to design patterns for the first and second blanks based on dimensions for the specific model of the specific rectangular shaped portable electronic device.

15. The method of claim 11, further comprising:

shipping the box or bag, which includes the custom first and second mounting brackets with the one or more of the selected version of the brace element attached to each of the first and second mounting brackets, along with the unit of each of the first and second neck portions obtained from inventory, the unit of the collar obtained from inventory, and the unit of the fastener hardware obtained from inventory.

16. The method of claim 11, further comprising:

stocking in inventory multiple units of each of two or more versions of a neck base that can be attached to the first and second neck portions of the security apparatus and is used to attach the security apparatus to a display surface;

selecting one of the versions of the neck base; and including, within the box or bag, the selected version of the neck base.

17. The method of claim 16, wherein the selecting one of the versions of the neck base is based on a customer request.

18. The method of claim 16, wherein:

a first said version of the neck base includes a first number of bolts;

a second said version of the neck base includes a second number of bolts that differs from the first number of bolts; and a third said version of the neck base includes a single cylindrical threaded rod.

19. The method of claim 11, wherein the rectangular shaped portable electronic device that the apparatus can be used to secure to a display surface comprises a mobile phone or a tablet computer.

20. The method of claim 11, wherein the rectangular shaped portable electronic device that the apparatus can be used to secure to a display surface comprises an e-reader or a personal data assistant.

* * * * *